United States Patent [19]
Schwartz et al.

[11] Patent Number: 6,162,505
[45] Date of Patent: Dec. 19, 2000

[54] COATING MINERAL MOLDINGS

[75] Inventors: Manfred Schwartz, Frankenthal; Bertold Bechert, Grünstadt, both of Germany

[73] Assignee: BASF Aktiengesellschaft, Lugwigshafen, Germany

[21] Appl. No.: 09/263,822

[22] Filed: Mar. 8, 1999

[30] Foreign Application Priority Data

Mar. 9, 1998 [DE] Germany .............. 198 10 052

[51] Int. Cl.[7] .................. B05D 5/06; B05D 5/10
[52] U.S. Cl. ................. 427/407.1; 427/138
[58] Field of Search .................. 427/407.1, 138

[56] References Cited

U.S. PATENT DOCUMENTS

| | | | |
|---|---|---|---|
| 5,215,827 | 6/1993 | Dotzauer et al. | 428/500 |
| 5,426,146 | 6/1995 | Aydin et al. | |
| 5,718,943 | 2/1998 | Hsu et al. | 427/136 |

FOREIGN PATENT DOCUMENTS

| | | |
|---|---|---|
| 2046215 | 1/1992 | Canada . |
| 469295 | 12/1994 | European Pat. Off. . |
| 2164256 | 6/1973 | Germany . |
| 19514266 | 10/1996 | Germany . |
| 1411268 | 10/1975 | United Kingdom . |
| WO 96/33143 | 10/1996 | WIPO . |

OTHER PUBLICATIONS

T.G. Fox, Bull. Am. Phys. Soc., Ser. II, 1, p. 123, 1956.
Ullmanns Enzyklopädie der technischen Chemie, vol. 19, pp. 17–20, "Polyacryl– Und Polymethacryl–Verbindungen", 1980.
Ullmanns Enzyklopädie der technischen Chemie, vol. A 21, pp. 169–171, "Polyacrylates", 1992.
J. Brandrup, et al., eds., Polymer Handbook, Table of Contents, 3 pages, 1989.

*Primary Examiner*—Shrive Beck
*Assistant Examiner*—Jennifer Kolb
*Attorney, Agent, or Firm*—Oblon, Spivak, McClelland, Maier & Neustadt, P.C.

[57] ABSTRACT

The present invention relates to a process for coating mineral moldings with film-forming aqueous formulations in which in succession at least one 1st formulation comprising at least one copolymer P1 as binder and at least one inorganic pigment is applied to the mineral molding and, if desired, is dried and then at least one 2nd formulation comprising at least one copolymer P2 as binder and, if desired, inorganic pigment is applied, the copolymers P1 and P2 each being composed of monomers A, B and, if desired, C, wherein identical monomers A and B are selected in each case for the copolymers P1 and P2 and the 1st. formulation has a pigment volume concentration which is greater by at least 10 than that of the 2nd formulation, and to a composition of said 1st and 2nd formulations and to the use of said 1st and 2nd formulations for coating mineral moldings.

9 Claims, No Drawings

COATING MINERAL MOLDINGS

The present invention relates to a process for coating mineral moldings with film-forming aqueous formulations. By mineral moldings are meant here and below shaped articles which comprise mineral aggregates, such as sand, clay, size-reduced stone, etc., and a mineral binder, with or without customary additives. Mineral binders are common knowledge and comprise, for example, finely divided inorganic substances, such as lime, gypsum, clay and/or cement, which can be shaped in the moist state and which, when left to themselves, solidify after a certain time in air or else under water, with or without exposure to elevated temperature.

The aggregates consist in general of granular or fibrous, natural or synthetic stone (gravel, sand, mineral fibers), including in special cases metals as well, or organic aggregates or mixtures of said aggregates, with grain sizes or fiber lengths that are adapted in the conventional manner to the specific application intended. In many cases, color pigments are also used as aggregates, for the purpose of coloring.

Examples of mineral moldings to be coated in accordance with the invention are concrete pipes, as used to transport wastewater, concrete roof tiles or kerbstones, steps, base slabs and pedestal slabs based on mineral binders, and also fiber-reinforced cement slabs, i.e. flat mineral moldings filled with inorganic or organic fibers, such as polyester fibers or nylon fibers, for example.

A disadvantage of mineral moldings is that under the effects of weathering (especially exposure to water) the cationic constituents, such as $Ca^{2+}$, are leached out over the course of time, reducing the strength of the articles. This is often accompanied by instances of efflorescence. These are probably attributable to the fact that polyvalent cations such as $Ca^{2+}$ react with atmospheric carbon dioxide to form unsightly white spots of lime on the surface of the mineral moldings. The phenomenon of efflorescence may appear either as early as during the hardening of freshly prepared mineral molding, or on exposure to weathering of mineral moldings which have already hardened.

In order to avoid the above disadvantageous qualities, the mineral moldings are frequently provided with a coating. For this purpose use is generally made of aqueous coating systems whose film-forming constituent (binder) comprises an aqueous polymer dispersion. Customary binders include styrene-acrylate copolymers, vinyl acetate homo- and copolymers, pure acrylates and the like (cf. for example DE 21 64 256). However, the coatings obtainable with these binders are unable to prevent satisfactorily the emergence of the cationic constituents (efflorescence). Furthermore, such coatings are easily soiled.

The protection of mineral moldings against the above-described efflorescence phenomena has also been improved by means of coating compositions based on styrene-acrylate or all-acrylate dispersions as per EP-A-469 295 and DE-A-195 14 266. To provide this improvement, EP-A-469 295 recommends the use of a specific anionic emulsifier and DE-A-195 14 266 the use of polymers whose copolymerized monomers include specific monomers having sulfonate groups.

The abovementioned formulations are generally applied in at least two coats to the mineral molding. Thus by twofold coating with methyl methacrylate-alkyl acrylate polymers (i.e. all-acrylate polymers) gives coatings which are of low pigment content and have the desired surface properties, such as high gloss, but with limited protection against efflorescence. Coating with a first, coloring formulation which protects against efflorescence and is based on styrene-acrylate copolymers and then with an all-acrylate-based formulation leads to good protection against efflorescence and ensures high gloss; however, these coatings are problematic in terms of their long-term stability under weathering conditions, which is manifested in blistering and poor adhesion.

It is an object of the present invention to provide a process and composition for coating mineral moldings, leading to coatings which are of high stability under weathering conditions and which impart very good surface properties to the mineral molding.

We have found that this object is achieved and that coated mineral moldings possessing the desired resistance to efflorescence, weathering stability and surface properties are obtained if at least two aqueous, film-forming formulations are applied in succession to the mineral molding, the 1st formulation applied first comprising a copolymer P1 and the 2nd formulation applied thereafter comprising a copolymer P2 as binders, copolymers P1 and P2 each being composed of copolymerized monomers A, B and, if desired, C, identical monomers from A and B and, if desired, monomers C being selected in each case for P1 and P2 and the 1st formulation having a pigment volume concentration which is greater by at least 10 than that of the 2nd formulation applied subsequently.

The present invention thus provides a process and composition for coating mineral moldings with film-forming aqueous formulations in which in succession at least one 1st formulation comprising at least one copolymer P1 as binder and at least one inorganic pigment is applied to the mineral molding and, if desired, is dried and then at least one 2nd formulation comprising at least one copolymer P2 as binder and, if desired, inorganic pigment is applied, the copolymers P1 and P2 each being composed of copolymerized monomers A, B and, if desired, C and the monomers A being vinylaromatic compounds (A1) and methacrylic esters of $C_1$–$C_4$-alkanols (A2), the monomers B being esters, other than A2, of $\alpha,\beta$-ethylenically unsaturated carboxylic acids with $C_1$–$C_{12}$-alkanols (B1) and vinyl esters of aliphatic carboxylic acids (B2), and the monomers C being different $\alpha,\beta$-ethylenically unsaturated monomers, wherein identical monomers A and B are selected in each case for the copolymers P1 and P2 and the formulation which is applied first has a pigment volume concentration which is greater by at least 10 than that of the formulation applied subsequently.

The pigment volume concentration (pvc) is 100 times the quotient of pigment volume plus filler volume to binder volume plus pigment volume plus filler volume (cf. Ullmann's Encyclopedia of Industrial Chemistry, 4th Edition, Volume 15, p. 667).

The copolymers P1 and P2 respectively are normally prepared by free-radical addition polymerization of at least two ethylenically unsaturated monomers A, B and, if desired, further monomers C per copolymer. The monomers A comprise two monomers A1 and A2 and the monomers B two monomers B1 and B2. In an embodiment of the invention, for both P1 and P2 identical monomers from A and B are selected in each case. Accordingly, the copolymers P1 and P2 of the invention comprise either monomers A1 or monomers A2 or in each case monomers A1 and A2 as copolymerized monomers A and comprise either monomers B1 or monomers B2 or in each case monomers B1 and B2 as copolymerized monomers B.

Suitable monomers A1 are vinylaromatic monomers, such as styrene, $\alpha$-methylstyrene, o-chlorostyrene or vinyltoluenes, while suitable monomers A2 are methacrylic esters of $C_1$–$C_4$-alkanols. Preferred methacrylic esters are methyl, ethyl, n-propyl, isopropyl and n-butyl methacrylate. Particular preference is given to methyl methacrylate as monomer A2. In preferred embodiments of the process and composition the monomers A are either styrene or methyl methacrylate. Suitable monomers B1 comprise esters, other than A2, of α,β-ethylenically unsaturated carboxylic acids with $C_1$–$C_{12}$-alkanols. Suitable examples are the esters of $C_3$–$C_8$ monocarboxylic acids such as acrylic, crotonic and. vinylacetic acid. The esters of acrylic acid are preferred. Suitable $C_1$–$C_{12}$-alkanols include methanol, ethanol, n-propanol, isopropanol, 1-butanol, 2-butanol, isobutanol, tert-butanol, n-hexanol, 2-ethylhexanol and $C_5$–$C_8$-cycloalkanols, such as cyclopentanol or cyclohexanol. Preference is given. in particular to esters of acrylic acid with $C_2$–C8-alkanols; ethyl acrylate, n-butyl acrylate and ethylhexyl acrylate are particularly preferred. Likewise suitable are the methacrylic esters of $C_5$–$C_{12}$-alkanols. Suitable monomers B2 include vinyl esters of aliphatic $C_1$–$C_{18}$ monocarboxylic acids, such as vinyl acetate, propionate, butyrate, valerate, hexanoate, 2-ethyl.hexanoate, decanoate, pivalate, laurate and stearate and commercially available monomers VEOVA® 5–11 (VEOVA® X is a tradename of Shell and stands for vinyl esters of α-branched aliphatic carboxylic acids having X carbon atoms, these acids also being referred to as Versatic® X acids).

Based on the overall monomer amount, the monomers A and B generally make up at least 65% by weight, preferably at least 90% by weight and, in particular, at least 95% by weight. The monomers C are generally used in amounts <35% by weight, preferably <10% by weight and, in particular, <5% by weight based on the overall amount of the monomers A, B and C.

The copolymers P1 and P2 respectively generally include at least one further copolymerized monomer C. Suitable monomers C comprise α,β-ethylenically unsaturated monomers other than monomers A and B. These include α,β-ethylenically unsaturated $C_3$–$C_8$ mono- and dicarboxylic acids (monomers C1), such as acrylic,. methacrylic, crotonic, vinylacetic, maleic, fumaric, itaconic, acrylamidoglycolic and methacrylamidoglycolic acid, the amides of $C_3$–C8 monocarboxylic acids (monomers C2), especially acrylamide and methacrylamide, ethylenically unsaturated sulfonic acids (monomers C3), such as vinyl-, 2-acrylamido-2-metliylpropane-, 2-acryloyloxyethane-, 2-methacryloyloxyethane-, 3-acryloyl-oxypropane-, 3-methacryloyloxypropane- and vinylbenzenesulfonic acid and the salts thereof, preferably the alkali metal salts or ammonium salts and, in particular, the sodium salts thereof. The monomers C1 are normally employed in amounts of from 0.1 to 10% by weight, preferably from 0.2 to 5% by weight and, in particular, from 0.5 to 2.5% by weight, based on the overall amount of monomers A+B+C. The monomers C2 are usually employed in amounts of from 0.1 to 10% by weight, preferably from 0.2 to 5% by weight and, in particular, from 0.5 to 2.5% by weight, again based on the overall amount of monomers A+B+C. The monomers C3 are usually employed in amounts of from 0.05 to 5% by weight and, preferably, from 0.1 to 3% by weight, based on the overall amount of monomers A+B+C. Among the monomers C1 to C3 preference is given to the monomers C1, especially acrylic, methacrylic and itaconic acid, and to the monomere C2, especially acrylamide and methacrylamide. With very particular preference the copolymers P1 and P2 comprise at least one monomer C1 and/or C3 and at least one monomer C2, in copolymerized form. The overall amount of the monomers C1 to C3 is preferably within the range from 0.1 to 10% by weight, in particular from 0.2 to 5% by weight, based on the overall amount of monomers A+B+C. The monomers C may also include monomers C4. Examples of suitable monomers C4 are siloxane-functional monomers such as the vinyltrialkoxysilanes, e.g. vinyltrimethoxysilane, alkylvinyldialkoxysilanes or (meth)acryloyloxyalkyltrialkoxysilanes, e.g. (meth)acryloyloxyethyltrimethoxysilane and (meth)acryloyloxypropyltrimethoxysilane. Where desired, the monomers C4 are employed in amounts of from 0.05 to 5% by weight, in particular from 0.1 to 2% by weight, based on the overall amount of the monomers A+B+C.

In certain embodiments the monomers C may also embrace crosslinking monomers; preferably, however, the copolymers P1 and P2 are free from crosslinking monomers.

In a preferred embodiment of the process of the invention, P1 and P2 are identical. Alternatively, P1 and P2 can be different. In this case the proportions of A to B, like the monomers A and B themselves, can be different. In the latter case, the monomers A in P1 and P2 should differ by not more than 2 carbon atoms; the same applies to the monomers B.

Preferred embodiments of the process relate to copolymers P1 and P2 for which the respective proportions A:B differ by less than 30%, in particular by less than 20%, from one another. In a preferred embodiment the ratio A:B for P1 and P2 is identical.

In the copolymers P1 and P2 respectively the ratio of the copolymerized monomers A:B is in general from 80:20 to 20:80% by weight.

Typical monomer combinations A/B are:

styrene: n-butyl acrylate in a weight ratio of 35:65–80:20, styrene: 2-ethylhexyl acrylate in a weight ratio of 35:65–80:20, methyl methacrylate: n-butyl acrylate in a weight ratio of 40:60–80:20, methyl methacrylate: 2-ethylhexyl acrylate in a weight ratio of 35:65–80:20, and also ternary and quaternary monomer mixtures A/B in which some of the styrene has been replaced by methyl methacrylate and/or n-butyl methacrylate, or some of the n-butyl acrylate by 2-ethylhexyl acrylate, examples being:

methyl methacrylate:styrene:2-ethylhexyl acrylate in a weight ratio of 20:20:60, n-butyl methacrylate:styrene:2-ethylhexyl acrylate in a weight ratio of 35:10:55, methyl methacrylate:n-butyl methacrylate:n-butyl acrylate in a weight ratio of 30:35:35, styrene:n-butyl acrylate:2-ethylhexyl acrylate in a weight ratio of 50:25:25 and styrene:methyl methacrylate:n-butyl acrylate:2-ethylhexyl acrylate in a weight ratio of 20:20:30:30.

It is essential to the invention, furthermore, for the copolymers to have a glass transition temperature of from −25 to +80° C. It should be borne in mind here that a high-quality coating is only obtained when the aqueous formulations of the film-forming copolymers P1 and P2 respectively have a minimum film-forming temperature which is below the temperature of use. The minimum film-forming temperature depends in turn on the glass transition temperature $T_g$ of the polymers P1 and P2 respectively (see Ullmann's Encyclopedia of Industrial Chemistry, 5th ed., Vol. A 21, 1992, p. 169). Accordingly, a low glass transition temperature of the copolymers P1 and P2 respectively leads to improved filming. On the other hand, a low glass transition temperature entails increased tackiness of the coating and hence an increased likelihood of the coating becoming soiled. Moreover, a low glass transition temperature is generally the cause of a deterioration in blocking resistance. In principle, the minimum film-forming temperature can be influenced by adding what are known as external plasticizers of low volatility to the aqueous formulation, such as esters of phthalic acid, and/or highly volatile, low-boiling organic solvents, as film-forming auxiliaries.

It has proven advantageous to tailor the formulations that are employed in accordance with the invention to their specific end applications by choosing an appropriate glass transition temperature for the copolymers P1 and P2. For instance, a glass transition temperature $T_g$ for the copolymers P of above −10° C. and, in particular, above +10° C. has been found advantageous for the coating of precast concrete products. In this embodiment of the invention it is preferred not to exceed a $T_g$ of +50° C. In the case of fiber-reinforced precast concrete products, which both can be coated at elevated temperature and are intended to have a high blocking resistance, on the other hand, a glass transition temperature of above +20° C., and in particular above +30° C., has been found advantageous. The glass transition temperature $T_g$ referred to here is the midpoint temperature determined in accordance with ASTM D 3418-82 by differential thermal analysis (DSC) (cf. Ullmann's Encyclopedia of Industrial Chemistry, 5th Edition, Volume A 21, VCH Weinheim 1992, p. 169 and also Zosel, Farbe und Lack 82 (1976), 125–134; see also DIN 53765). The glass transition temperature can also be determined from the measurement of the modulus of elasticity in the creep test as a function of temperature.

It proves useful in this context to estimate the glass transition temperature $T_g$ of the copolymers P1 and P2 respectively. According to Fox (T. G. Fox, Bull. Am. Phys. Soc. (Ser. II) 1, 123 [1956] and Ullmanns Enzyklopadie der technischen Chemie, Weinheim (1980), pp. 17,18) the glass transition temperature of copolymers with a low degree of crosslinking, at high molar masses, is given in good approximation by $$\frac{1}{T_g} = \frac{X^1}{T_g^1} + \frac{X^2}{T_g^2} + \cdots \frac{X^n}{T_g^n}$$

where $X^1, X^2, \ldots, X^n$ are the mass fractions $1, 2, \ldots, n$ and $T_g^1, T_g^2, \ldots, T_g^n$ the glass transition temperatures of the homo- polymers of the monomers $1, 2, \ldots, n$, in kelvins. The latter are given, for example, in Ullmann's Encyclopedia of Industrial Chemistry, VCH, Weinheim, Vol. A 21 (1992) p. 169 or in J. Brandrup, E. H. Immergut, Polymer Handbook 3rd ed., J. Wiley, New York 1989.

The copolymers P1 and P2 present in the aqueous formulations 1 and 2 and employed in the processes of the invention can in principle be prepared by any conceivable method for the free-radical copolymerization of ethylenically unsaturated monomers, by, for example, solution, precipitation, bulk, emulsion or suspension polymerization. Preference is given to the free-radical aqueous emulsion polymerization of the abovementioned monomers in the presence of at least one free-radical polymerization initiator and, if desired, of one or more surface-active substances, since in this case the copolymers P1 and P2 are obtained in the form of aqueous dispersions. it is of course also possible, however, to operate by the other polymerization methods. It may then be necessary, if appropriate, to carry out subsequent conversion of the copolymers P1 and P2 to an aqueous dispersion (secondary dispersion). The copolymers P1 and P2 can also be employed in the form of solutions in water/solvent mixtures.

The formulations of the invention preferably contain the copolymers P1 and P2 in the form of aqueous dispersions. In these dispersions the particles of the copolymers can have average sizes within the range from 50 to 1000 nm. Methods of adjusting the polymer particle size are disclosed, for example, in EP-A-567 819.

Suitable free-radical polymerization initiators are all those that are able to trigger a free-radical aqueous emulsion polymerization. It is also possible for this purpose to use redox initiator systems, which comprise a small amount of a metal compound which is soluble in the polymerization medium and whose metallic component is able to exist in a plurality of valence states, an example being iron(II) sulfate. Initiators which are likewise preferred are alkali metal peroxodisulfates, such as sodium peroxodisulfate, or ammonium peroxodisulfate. The amount of free-radical initiator systems employed, based on the overall amount of monomers to be polymerized, is preferably from 0.05 to 2% by weight, more preferably from 0.1 to 1% by weight.

Surface-active substances suitable for conducting the emulsion polymerization are the emulsifiers and protective colloids that are normally employed for such purposes. The surface-active substances are usually employed in amounts of up to 10% by weight, preferably from 0.5 to 5% by weight and, in particular, from 1 to 4% by weight, based on the monomers to be polymerized.

Examples of suitable protective colloids are polyvinyl alcohols, starch derivatives and cellulose derivatives, or vinylpyrrolidone copolymers. Mixtures of emulsifiers and/or protective colloids can also be used. As the surface-active substances it is preferred to employ exclusively emulsifiers, whose relative molecular weights, in contradistinction to the protective colloids, are usually below 2000. They may be anionic, cationic or nonionic in nature. Anionic emulsifiers include alkali metal salts and ammonium salts of alkyl sulfates (alkyl: $C_8$–$C_{12}$), of sulfuric monoesters of ethoxylated alkanols (EO units: 2 to 50, alkyl: $C_{12}$ to $C_{18}$) and ethoxylated alkylphenols (EO units: 3 to 50, alkyl: $C_4$–$C_9$), of alkylsulfonic acids (alkyl: $C_{12}$–$C_{18}$) and of alkylarylsulfonic acids (alkyl: $C_9$ to $C_{18}$).

The anionic surface-active substances also include compounds of the formula I

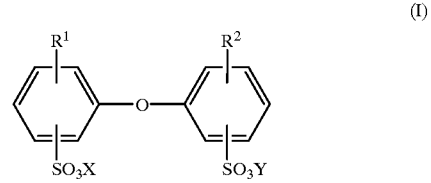

(I)

where $R^1$ and $R^2$ are hydrogen or $C_4$–$C_{24}$-alkyl but are not both hydrogen and X and Y can be alkali metal and/or ammonium ions. The compounds I are known commonly—for example, from EP-A-469 295. Particularly advantageous compounds I are those where X and Y are sodium, $R^1$ is a branched alkyl of 12 carbon atoms and $R^2$ is hydrogen or is the same as $R^1$. Use is frequently made of technical mixtures containing from 50 to 90% by weight of the monoalkylated product, an example being Dowfax® 2A1 (trademark of Dow Chemical Company).

Suitable nonionic emulsifiers are araliphatic or aliphatic nonionic emulsifiers, examples being ethoxylated mono-, di- and trialkylphenols (EO units: 3 to 50, alkyl: $C_4$–$C_9$), ethoxylates of long-chain alcohols (EO units: 3 to 50, alkyl:

$C_8$–$C_{36}$), and polyethylene oxide/polypropylene oxide block copolymers. Preference is given to anionic emulsifiers, especially emulsifiers of the formula I, or combinations of at least one anionic and one nonionic emulsifier.

The molecular weight of the polymers can be adjusted by adding small amounts, generally up to 2% by weight based on the monomers to be polymerized, of one or more molecular weight regulators, examples of these being organic thio compounds, silanes, allyl alcohols and aldehydes.

The emulsion polymerization can be conducted either continuously or batchwise, preferably by a semicontinuous procedure. In this case the monomers to be polymerized can be supplied continuously, including by a stepwise or gradient regime, to the polymerization batch.

The monomers can be supplied to the polymerization either as a monomer mixture or else as an aqueous monomer emulsion.

The temperature and pressure of polymerization are of minor importance. It is generally conducted at temperatures between room temperature and 120° C., preferably at temperatures from 40 to 110° C. and, with particular preference, from 50 to 100° C.

Following the actual polymerization reaction it may be necessary to substantially free the aqueous polymer dispersions of the invention from odoriferous substances, such as residual monomers and other volatile organic constituents.

In this way it is possible to obtain polymer dispersions having polymer contents of up to 80% by weight, based on the overall weight of the dispersion. For preparing the formulations employed in accordance with the invention it is preferred on practical grounds to employ dispersions having polymer contents in the range from 30 to 70% by weight, in particular from 40 to 65% by weight.

The polymer dispersions are preferably neutralized with bases, especially alkali metal hydroxide solutions, such as sodium or potassium hydroxide solution, particular preference being given to a pH in the range from 7 to 8.

The 1st and 2nd formulations employed in accordance with the invention can in principle take any desired form, i.e. that of solutions or dispersions of the copolymers P1 and P2 respectively. The solution or dispersion medium preferably comprises aqueous solvents, i.e. water or mixtures of water and a water-miscible organic solvent such as a $C_1$–$C_4$-alk.anol, for example, methanol, ethanol, n-propanol, isopropanol, n-butanol, isobutanol, 2-butanol or tert-butanol, glycol, propylene glycol, butylene glycol, glycerol, diethylene glycol, triethylene glycol, tetrahydrofuran or the like.

The copolymers P1 and P2 of the invention are preferably employed in the form of aqueous formulations containing not more than 50% by weight, in particular not more than 20% by weight and specifically not more than 10% by weight, based on the overall weight of the formulation, of water-miscible solvents. With very particular preference the formulations of the invention, in addition to water, contain no organic solvents other than customary antifreeze agents and film-forming auxiliaries. Within these formulations the copolymers P1 and P2 are generally in the form of aqueous dispersions.

In accordance with the invention, the solutions and dispersions of the copolymers P1 and P2 can be used as they are. However, the formulations generally include from 0.1 to 30% by weight of customary auxiliaries. In addition the aqueous formulations, insofar as the copolymers P1 and P2 respectively have been prepared by free-radical aqueous emulsion polymerization, also include the surface-active substances employed for this purpose, such as emulsifiers and/or protective colloids.

Examples of customary auxiliaries are wetting agents, fungicides, defoamers, thickeners, antifreezes, flow promoter, plasticizers and film-forming auxiliaries.

It is also essential to the invention for at least the 1st formulation to comprise fillers and/or inorganic pigments. The 2nd formulation as well may include fillers and/or inorganic pigments, but it is essential to the invention that said filled and/or pigmented 1st formulation has a pigment volume concentration which is greater by at least 10 than that of the optionally filled and/or pigmented 2nd formulation.

Typical fillers incude alumosilicates, such as feldspars, silicates, such as kaolin, talc, mica, magnesite, alkaline earth metal carbonates, such as calcium carbonate in the form, for example, of calcite or chalk, magnesium carbonate, dolomite, alkaline earth metal sulfates, such as calcium sulfate, and also silica, etc. Examples of typical pigments are titanium dioxide, preferably in the rutile form, barium sulfate, zinc oxide or lithopones (zinc sulfide+barium sulfate). For decorative purposes the formulations may also include colored pigments, examples being iron oxides, carbon black, graphite, zinc yellow, zinc green, ultramarine, manganese black, antimony black, manganese violet, Paris blue or Schweinfurt green.

In the aqueous, filled and/or pigmented 1st and 2nd formulation respectively the overall content of copolymer P1 or P2 is within the range from 10 to 60% by weight, preferably from 20 to 40% by weight, the content of auxiliaries is within the range from 0.1 to 30% by weight, preferably from 0.5 to 10% by weight, and the content of fillers and/or pigments is within the range from 10 to 60% by weight, in particular from 15 to 40% by weight. The amount of pigments and/or fillers is in general from 50 to 450 parts by weight per 100 parts by weight of copolymer P1 and P2, respectively, in the aqueous formulation. Pigmented formulations will also preferably include a dispersant and/or wetting agent in addition to the film-forming auxiliari es and the defoamers.

The process of the invention embraces the coating of mineral molding swith the film-forming aqueous formulations described above by applying in succession at least one 1st formulation as described above comprising at least one copolymer P1 as binder and at least one inorganic pigment to the mineral molding and, if desired, drying it and then applying at least one 2nd formulation as described above comprising at least one copolymer P2 as binder and, if desired, inorganic pigment to the already coated surface of the mineral molding and then drying it. In general, the sum of the amount of aqueous formulations to be applied is in the range from 100 to 700 g/m² (calculated wet), corresponding to a dry add-on of from 50 to 400 g/m² a nd, in particular, from 100 to 300 g/m², the first appli cation with the 1st formulation corresponding to from 50 to 90% by weight, preferably from 60 to 80% by weight, of the sum of the amoun ts to be applied. The 1st and 2nd formulation scan be applied in conventional manner by spraying, troweling, knife coating, rolling or pouring. The drying which may if desired follow the application of the 1st formulation can take place either at room temperature or at an elevated temperature in the range, for example, from 40 to 100° C. The drying step following the application of the second dispersion generally takes place at an elevated temperature which is preferably in the range from 40 to 120° C.

The process of the invention can be applied in principle to all moldings comprising a mineral binder. It develops its preferential effects when applied to mineral moldings comprising cement a s their binder (precast concrete products eand fiber-reinforced cement slabs). By precast concrete prodicts are meant shaped structures of concrete and/or gas concrete, examples being slabs, pipes and/or roof tiles. The precast concrete product is produced conventionally from ready-mixed concrete by an extrusion process. The aqueous formulations of the invention have the advantage here, especially the 1st formulation, that they can be applied not only to a precast concrete product which has already set but also to the freshly produced and not yet set "green" product. Application of a 1st formulation to a freshly produced min eral molding is a preferred embodiment of the process of the invention. Drying of the green precast concrete products coated in accordance with the invention can be carried out conventionally, either at room temperature or elevated temperature. The coated green precast concrete product is preferably introduced into what is known as a chamber, where it is set in a process lasting from about 6 to 24 hours at from 40 to 70° C. and during which the copolymer P1 of the 1st formulation forms a film. Following this procedure, the product is at least sprayed a second time with the aqueous 2nd formulation of the invention. Further drying takes place in a tunnel furnace at temperatures of the circulating air of from about 80 to 120° C.

Mineral moldings which have already set can also be coated at customary ambient temperatures, such as room temperature, with the formulations of the invention.

The advantageous properties of the aqueous formulations of the invention also apply in the case of mineral moldings that have been coated with a cement slurry. The aqueous formulations of the invention can be applied in the manner described above.

The aqueous formulations of the invention, furthermore, prove to be equally advantageous when applied to fiber-reinforced concrete slabs: that is, flat, mineral moldings which comprise cement as binder and also mineral or organic fibers, such as polyester and/or polyamide fibers, as aggregates. The application of the aqueuos formulations of the invention generally takes place as described for green precast concrete products.

The mineral moldings coated in accrdance with the process of the invention are notable firstly for good protection against efflorescence and good stability, including stability under weathering conditions, such a s low water uptake, for example, high slip resistance, and few signs of ageing, such as blistering or cracking. Secondly, they possess very good surface properties, evident from their high gloss, high blocking resistance and good adhesion properties. These properties are particularly important for concrete roof tiles, which are therefore a preferred embodiment of the invention. In addition, the process of the invention is advantageous economically owing to the simplified structure of the coating and to the comparatively low concentration of binder copolymers. Accordingly, the process of the invention leads to improved preservation and improved properties of mineral moldings.

The mineral moldings coated in this way are novel and likewise provided by the present invention.

The compositions of the invention comprise two separate components (1st and 2nd formulations) which may be present together or in separate packaging units.

The examples given below are intended to illustrate the present invention.

EXAMPLES

I. Preparing the Film-forming Copolymers P1 and P2 in the Form of Aqueous Dispersions (dispersions D1 and D2)
Preparation procedure
a) Dispersion D1

A polymerization vessel was charged with 400 g of deionized water, 1.4 g of itaconic acid and 6.22 g of emulsifier solution 1 and this initial charge was heated to 85° C.

In a feed vessel 1, an emulsion was prepared from
200.0 g ofdeionized water
9.3 g of emulsifier solution 1
37.3 g of emulsifier solution 2
413.0 g of methyl methacrylate
287.0 g of n-butyl acrylate
28.0 g of a 50% strength by weight aqueous solution of the sodium salt of 2-acrylamido-2-methylpropanesulfonic acid
7.0 g of a 50% strength by weight aqueous solution of acrylamide.

In a second feed vessel 2, a solution of 1.4 g of sodium peroxodisulfate in 75 g of water was prepared.

Subsequently, still at 85° C., 49 g of feedstream 1 and 7.6 g of feedstream 2 were added in succession in one portion to the initial charge, and reaction was allowed to take place for 30 minutes.

This was followed by the addition to the polymerization vessel, beginning concurrently and by way of spatially separate feed ports, of the remaining amounte of feedstream 1, added over the course of 3 h, and of feedstream 2, added over the course of 3.5 h, while retaining the 85° C. Following the end of feedstream 2, postpolymerization was allowed to take place for 1 h and then the batch was cocled to 25° C. and neutralized with sodium hydroxide solution (pH≈8).

The solids content of the resulting dispersion was about 49% by weight. The glass transition temperature $T_g$ of the resulting copolymer is 37.8, determined by DSC in accordance with DIN 53765.

Emulsifier Solution 1:
45% strength by weight aqueous solution of an active substance (mixture of mono- and di-$C_1$–$C_{12}$-alkyl compounds of the formula I as sodium salt) available commercially as Dowfax® 2A1 (Dow Chemical)

Emulsifier Solution 2:
15% strength by weight aqueous solution of the sodium salt of a $C_{12}$-alkyl sulfate b) Dispersion D2
In a polymerization vessel, an aqueous emulsion of
105.0 g of deionized water
54.0 g of styrene
44.0 g of n-butyl acrylate
2.0 g ofacrylic acid
0.5 g of γ-methacryloylpropyltrimethoxysilane
0.5 g of sodium lauryl sulfate
0.5 g of sodium peroxodisulfate
was polymerized at 90° C. by the method of free-radical aqueous emulsion polymerization using the emulsion feed procedure. The solids content of the resulting dispersion was about 50% by weight. The glass transition temperature $T_g$ of the resulting copolymer is +30° C., determined by DSC in accordance with DIN 53765.

II. Determining the Performance Properties
1. Preparing a pigmented dispersion with a pvc of 27: 0.5 g of a defoamer (Tego Foamex® 825 from Th. Goldschmidt AG) and 0.5 g of a technical mixture of the di-n-butyl esters of succinic, glutaric and adipic acid are added to 100 g of each of the dispersions D1 and D2. The dispersion D1 thus treated was used to formulate an emulsion paint. This was done by suspending 253.0 g of a commercial filler (calcium carbonate/calcium silicate) and 38.8 g of red iron oxide pigment from Bayer AG in 112.0 g of water. 598.0 g of the treated dispersion D1 were added to this suspension with stirring. The resulting paint was allowed to age at room temperature for 48 h before its performance testing.

2. As described above, the treated dispersions D1 and D2 were used to prepare further paints with a pvc of 35, 42 and 45.

|  | pvc 35 | pvc 42 | pvc 45 |
|---|---|---|---|
| Dispersion | 495.5 g D2 | 421.5 g of D1 | 392.4 g of D1 |
| Water | 144.1 g | 165.3 g | 173.6 g |
| Pigment | 72.1 g | 82.6 g | 86.8 g |
| Filler | 288.3 g | 330.6 g | 347.2 g |

3. Coating the mineral molding: Each of the paints described under II 1. was applied using a spray gun to a green precast concrete product*) (wet add-on about 210 g/m$^2$). This product was subsequently dried for 2 h at 40° C. and 75% relative atmospheric humidity and then for 4 h at 40° C. and 95% relative atmospheric humidity. It was then coated in the same way with a second paint (add-on about 105 g/m$^2$) and dried for 8 h at 40° C. and 50% relative atmospheric humidity (referred to as dry application).

The green precast concrete product used was a flat slab measuring 30×20×1.8 cm and produced by extruding a mortar of sand (grain size up to 0.3 mm) and cement (sand:cement weight ratio 4:1) together with water (water/cement weig ht ratio 1:2.5). The flat slab had a central curvature whose apex was abou t 4 cm above the plane of the baee.

III. Performance Testing

1. Determining the protection against efflorescence

After drying, the slab was placed for 7 d face down on a 60° C. water bath. The degree of efflorescence was assessed visually on the basis of the following scale of ratings. The results are compiled in Table 2.
0=no efflorescence
1=almost no efflorescence
2=slight efflorescence
3=moderate efflorescence
4=severe efflorescence
5=very severe efflorescence 2. Determining the gloss The test slabs already used under 1. for assessing the efflorescence protection are also used to assess the gloss. In this assessment, the gloss is assessed visually at exposed points, i.e. in regions where the steam was in direct contact with the coating. The results are compiled in Table 2 on the basis of the following scale of ratings:
0=very high gloss
1=high gloss
2=fairly high gloss
3=low gloss
4=slightly matt
5=matt, dull 3. Determining the blistering tendency The test slabs already assessed under 1. and 2. are also used to determine the blistering tendency. To do this, the formation of blisters is assessed visually at exposed areas (see above). The results are compiled in Table 2 on the basis of the following scale of ratings:
0=no blistering present
1=barely discernible
2=readily discernible
3=obvious
4=very obvious
5=extremely obvious 4. Determining the adhesion The test slabs already assessed under 1. to 3. are also used to determine the adhesion. The adhesion is determined by means of a TESA strip at exposed points (see above). This is done by applying a strip of the TESA tape about 10 cm long and about 3 cm wide to the surface of the slab under slight pressure with a rubber roller. After a few minutes, the adhesive strip is peeled away by pulling sharply. Any constituents adhering to the adhesive tape, and the amount of such constituents, are used for the assessment. The results are compiled in Table 2 on the basis of the following scale of ratings:
0=no constituents present
1=barely discernible
2=readily discernible
3=obvious
4=very obvious
5=extremely obvious 5. Test trials The following 5 examples (see Table 1), consisting of 3 comparative examples (CE1 to CE3) and two inventive examples (IE1, IE2), are assessed (see Table 2). The comparative examples CE1 and CE2 represent the first and second application of formulations of copolymers of the invention as binders but with identical pigment volume concentrations, not in accordance with the invention, in the two formulations. Comparative Example CE3 represents the application of a noninventive combination of copolymers as binders but with different pigment volume concentrations in the formulations, in accordance with the invention.

TABLE 1

| | Examples | | | |
|---|---|---|---|---|
| | First application (wet side) | | Second application (dry side) | |
| | Binder | pvc | Binder | pvc |
| CE1 | D1 | 27 | D1 | 27 |
| CE2 | D2 | 45 | D2 | 45 |
| CE3 | D2 | 45 | D1 | 27 |
| IE1 | D1 | 42 | D1 | 27 |
| IE2 | D2 | 45 | D2 | 35 |

TABLE 2

| | Results | | | |
|---|---|---|---|---|
| | Efflorescence | Gloss | Blistering | Adhesion |
| CE1 | 2 | 2 | 1 | 2 |
| CE2 | 2 | 4 | 1 | 2 |
| CE3 | 1 | 2 | 5 | 2 |
| IE1 | 1 | 2 | 1 | 1 |
| IE2 | 1 | 2 | 1 | 1 |

We claim:

1. A process for coating mineral moldings with film-forming aqueous formulations in which in succession at least one 1st formulation comprising at least one copolymer P1 as a binder and at least one inorganic pigment is applied to the mineral moldings, and then at least one 2nd formulation comprising at least one copolymer P2 as a binder pigment is applied, the copolymers P1 and P2 each being composed of monomers A, B and, optionally C, wherein:

the monomers A are vinyl aromatic compounds (A1) and/or methacrylic esters of $C_1$–$C_4$-alkanols (A2), the monomers B are esters, other than A2, of α,β-ethylenically unsaturated carboxylic acids with $C_1$–$C_{12}$-alkanols (B1) and/or vinyl esters of aliphatic carboxylic acids (B2), and the monomers C are different α,β-ethylenically unsaturated monomers, wherein both copolymers P1 and P2 comprise either monomers A1 or monomers A2 or both P1 and P2 comprise monomers A1 and A2 as copolymerized monomers A and both P1 and P2 comprise either monomers B1 or monomers B2 or both P1 and P2 comprise monomers B1 and B2 as copolymerized monomers B, with the proviso that:

either identical monomers A and B are selected for the copolymers P1 and P2 or the monomers A in P1 and P2 differ in their carbon number by not more than 2 carbon atoms and/or the monomers B in P1 and P2 differ in their carbon number by not more than 2 carbon atoms, and the 1st formulation has a pigment volume concentration which is geater by at least 10% than that of the 2nd formulation.

2. The process as claimed in claim 1, wherein the applied $1^{st}$ formulation is dried and the at least one $2^{nd}$ formulation further comprises an inorganic pigment.

3. The process as claimed in claim 1, wherein the monomers B in P1 differ in their carbon number from the monomers B in P2 by not more than 2 carbon atoms and the monomers A for P1 and P2 are identical.

4. The process as claimed in claim 1, wherein the proportions of A to B in the copolymers P1 and P2 differ from one another by less than 30%.

5. The process as claimed in claim 1, wherein the copolymers P1 and P2 each contain at least 80% by weight of copolymerized monomers A and B.

6. The process as claimed in claim 1, wherein the copolymer P1 and P2 have glass transition temperatures $T_g(P1)$ and $T_g(P2)$ in the range from −25 to +80° C.

7. The process as claimed in claim 1, wherein the 1st formulation has a pigment volume concentration in the range from 15 to 55 and the 2nd formulation has a pigment volume concentration in the range from 0 to 45 and the pigment volume concentration in the 1st formulation is greater by at least 10% than that of the 2nd formulation.

8. The process as claimed in claim 1, wherein the overall dry add-on of the 1 st and 2nd formulations is in the range from 50 to 400 g/m².

9. A process for coating mineral moldings with film-forming, non-foaming aqueous formulations in which in succession at least one 1st formulation comprising at least one copolymer P1 as a binder and at least one inorganic pigment is applied to the mineral moldings, and then at least one 2nd formulation comprising at least one copolymer P2 as a binder pigment is applied, the copolymers P1 and P2 each being composed of monomers A, B and, optionally C, wherein:

the monomers A are vinyl aromatic compounds (A1) and/or methacrylic esters of $C_1$–$C_4$-alkanols (A2), the monomers B are esters, other than A2, of α,β-ethylenically unsaturated carboxylic acids with $C_1$–$C_{12}$-alkanols (B1) and/or vinyl esters of aliphatic carboxylic acids (B2), and the monomers C are different α,β-ethylenically unsaturated monomers, wherein both copolymers P1 and P2 comprise either monomers A1 or monomers A2 or both P1 and P2 comprise monomers A1 and A2 as copolymerized monomers A and both P1 and P2 comprise either monomers B1 or monomers B2 or both P1and P2 comprise monomers B1 and B2 as copolymerized monomers B, with the proviso that:

either identical monomers A and B are selected for the copolymers P1 and P2 or the monomers A in P1 and P2 differ in their carbon number by not more than 2 carbon atoms and/or the monomers B in P1 and P2 differ in their carbon number by not more than 2 carbon atoms, and the 1st formulation has a pigment volume concentration which is greater by at least 10% than that of the 2nd formulation, and wherein the formulation contains at least one auxiliary selected from the group consisting of wetting agents, fungicides, defoamers, thickeners, antifreezes, flow promoters, plasticizers and film-forming agents.

* * * * *

UNITED STATES PATENT AND TRADEMARK OFFICE
CERTIFICATE OF CORRECTION

PATENT NO. : 6,162,505  
DATED : December 9, 2000  
INVENTOR(S) : Manfred Schwartz et al.

Page 1 of 1

It is certified that error appears in the above-identified patent and that said Letters Patent is hereby corrected as shown below:

Column 3,  
Line 16, "given. in" should read -- given in --;  
Line 17, "$C_2$-C8" should read -- $C_2$-$C_8$ --;  
Line 43, "$C_2$-C8" should read -- $C_2$-$C_8$ --;  
Line 46, "2-metliylpropane-," should read -- 2-methylpropane- --;  
Line 63, "monomere" should read -- monomers --.

Column 5,  
Line 63, "dispersons. it" should read -- dispersions. It --.

Column 7,  
line 43, "alk.anol" should read -- alkanol --.

Column 8,  
Line 52, "appli cation" should read -- application --;  
Line 55, "amoun ts" should read -- amounts --;  
Line 67, "cement a s their" should read -- cement as their --.

Signed and Sealed this

Second Day of October, 2001

Attest:

NICHOLAS P. GODICI  
Attesting Officer Acting Director of the United States Patent and Trademark Office